(12) United States Patent
Faucher et al.

(10) Patent No.: US 7,762,117 B2
(45) Date of Patent: Jul. 27, 2010

(54) CRIMP DIE HOLDING MECHANISM

(75) Inventors: Thomas R. Faucher, Manchester, NH (US); Mark A. Chiasson, Merrimack, NH (US)

(73) Assignee: Burndy Technology LLC, Manchester, NH (US)

( * ) Notice: Subject to any disclaimer, the term of this patent is extended or adjusted under 35 U.S.C. 154(b) by 254 days.

(21) Appl. No.: 12/002,588

(22) Filed: Dec. 17, 2007

(65) Prior Publication Data

US 2009/0151418 A1 Jun. 18, 2009

(51) Int. Cl.
*H01R 43/042* (2006.01)
*B21D 11/02* (2006.01)

(52) U.S. Cl. .................. 72/482.92; 72/416; 72/455; 72/465.1; 72/481.1; 72/482.91; 72/482.96; 83/698.31; 403/14; 403/304; 403/317

(58) Field of Classification Search ............ 72/416, 72/455, 465.1, 481.1, 482.91, 482.96; 83/698.31; 403/14, 304, 317
See application file for complete search history.

(56) References Cited

U.S. PATENT DOCUMENTS

| | | | | |
|---|---|---|---|---|
| 1,809,823 A | * | 6/1931 | Altvater | ............... 279/97 |
| 1,833,236 A | * | 11/1931 | Smith | ............... 403/327 |
| 2,448,278 A | | 8/1948 | Ronning | |
| 2,885,780 A | | 5/1959 | Campbell | |
| 2,926,034 A | | 2/1960 | Weaver | |
| 3,240,519 A | | 3/1966 | Weasler | |
| 3,974,868 A | | 8/1976 | Derbyshire | ............... 145/24 |
| 4,185,935 A | | 1/1980 | Bierlein | ............... 403/14 |
| 4,292,833 A | * | 10/1981 | Lapp | ............... 72/416 |
| 4,688,459 A | * | 8/1987 | Osborn et al. | ............... 83/698.31 |
| 5,193,419 A | | 3/1993 | Lee | ............... 81/177.2 |
| 5,253,949 A | | 10/1993 | Oxley et al. | ............... 403/317 |
| 5,421,186 A | * | 6/1995 | Lefavour | ............... 72/416 |
| 7,069,765 B2 | * | 7/2006 | Grove et al. | ............... 72/481.1 |
| 7,134,314 B1 | * | 11/2006 | Peterson et al. | ............... 72/455 |
| 7,168,286 B1 | * | 1/2007 | Pelech | ............... 72/482.92 |

OTHER PUBLICATIONS

"Redacted drawing sheet", PAT750XT-18V tool drawing, FCI/Burndy Products, 1 pg.
"Type WH3 Tool", 12 Ton Compression Tools, Kearney™ Hand Operated Hydraulic Tools, pp. 8-9.

* cited by examiner

*Primary Examiner*—David B Jones
(74) *Attorney, Agent, or Firm*—Harrington & Smith

(57) ABSTRACT

Disclosed herein is a crimp die holder. The crimp die holder includes a main body portion, a pin, and a spring. The main body portion includes a first recess, a second recess, and an opening. The first recess extends from a first side of the main body portion to a middle section of the main body portion. The second recess extends from a second side of the main body portion to the middle section. The opening extends from a third side of the main body portion and through a section of the second recess. The pin is disposed within the opening. The pin includes a first portion along a length of the pin. The first portion of the pin is configured to engage with a portion of a crimp die at the section of the second recess. The spring is between the main body portion and the pin.

23 Claims, 4 Drawing Sheets

CRIMP DIE HOLDING MECHANISM

BACKGROUND OF THE INVENTION

1. Field of the Invention

The invention relates to a crimp die and, more particularly, to a holding mechanism for a crimp die.

2. Brief Description of Prior Developments

Hydraulic crimping tools for compressing electrical connectors are known in the art. Many of these tools comprise a working head having a movable ram and crimping dies. One such tool is a Kearney™ Type WH4 tool 10 (a portion of which is illustrated in FIG. 1). The working head 12 generally receives removable crimping dies 14 at an end 16 of the working head 12 and at the movable ram 18.

Referring now also to FIG. 2, an enlarged view of the crimping die 14 is illustrated. The crimping die may be Kearney™ WH2 die, for example. The crimping die 14 comprises a main body portion 20 and a base portion 22 extending from the main body portion 20. The base portion 22 comprises an annular groove 24. The crimping dies 14 are attached to the working head 12 by utilizing a ball detent and/or a set screw to secure the dies 14 in place. For example, the ball detent and/or set screw is installed within an opening 26 in the movable ram. The opening 26 is aligned with the annular groove 24 of the base portion 22 such that a portion of the ball detent and/or set screw extends into the annular groove and retains the crimping die 14.

There is a desire to provide an improved die holding mechanism having a robust, reliable and easy to use configuration.

SUMMARY OF THE INVENTION

In accordance with one aspect of the invention, a crimp die holder is disclosed. The crimp die holder includes a main body portion, a pin, and a spring. The main body portion includes a first recess, a second recess, and an opening. The first recess extends from a first side of the main body portion to a middle section of the main body portion. The second recess extends from a second side of the main body portion to the middle section. The opening extends from a third side of the main body portion and through a section of the second recess. The pin is disposed within the opening. The pin includes a first portion along a length of the pin. The first portion of the pin is configured to engage with a portion of a crimp die at the section of the second recess. The spring is between the main body portion and the pin.

In accordance with another aspect of the invention, a working head is disclosed. The working head includes a die holder section and a pin. The die holder section includes a recess and an opening. The recess is configured to receive a portion of a crimp die. The pin is slidably disposed within the opening. The pin is configured to be slidable between a first position and a second position. The pin includes a first portion along a length of the pin. The first portion extends into the recess when the pin is in the first position. The first portion of the pin is configured to engage with the portion of the crimp die.

In accordance with another aspect of the invention, a method of attaching a die to a compression tool is disclosed. A pin is moved from a first position to a second position within an opening of a working head of the compression tool. A portion of a die is inserted into a recess of the working head. The pin is moved from the second position to the first position. A first portion of the pin is engaged with the portion of the die. The first portion of the pin extends along a length of the pin.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 3:
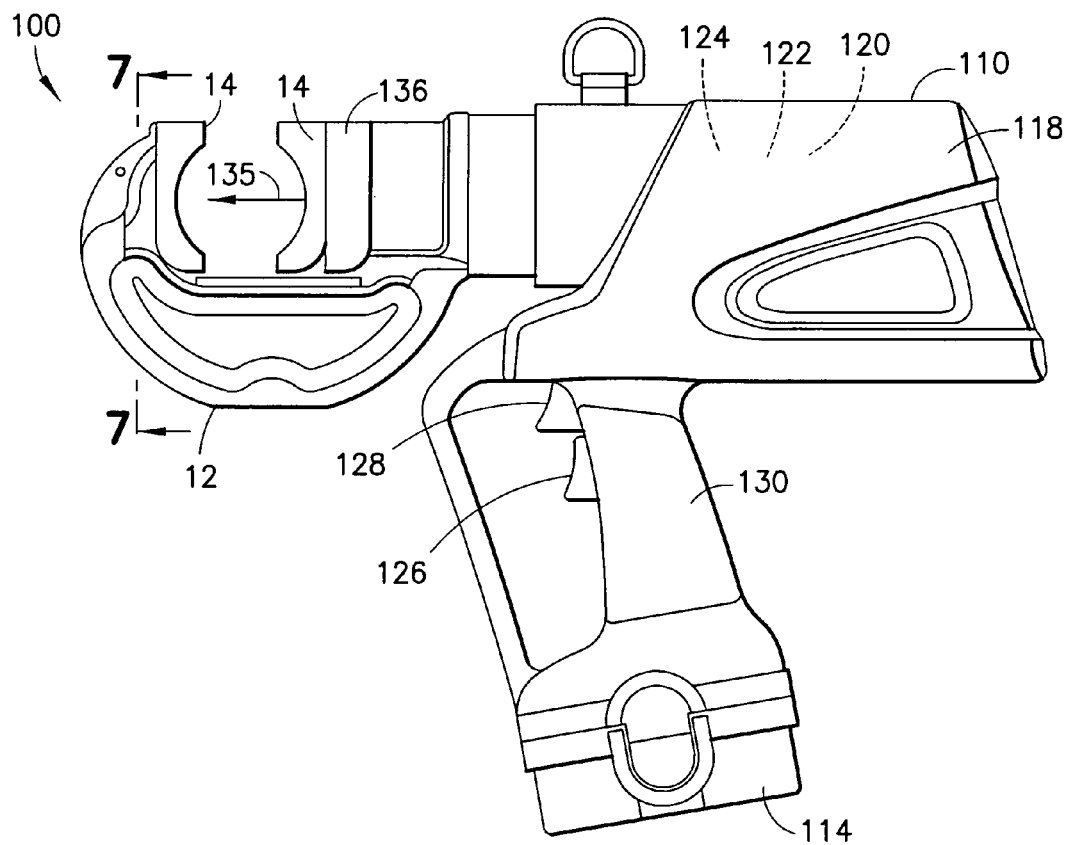
FIG. 3 is a side view of a hydraulic tool comprising features of the invention.

Referring to FIG. 3, there is shown a side view of a tool 100 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

The tool 100 is a hand-held battery operated hydraulic crimping tool. However, in alternate embodiments, features of the invention could be used in any suitable type of hydraulic tool or pneumatic tool, or tool having a movable ram. The tool 100 generally comprises a main section 110, a working head 112, and a battery 114. In this embodiment the working head 112 is adapted to receive removable crimp dies 14. However, in alternate embodiments any suitable dies could be provided including cutting dies for example.

The main section (or frame section) 110 generally comprises an exterior housing 118, an electric motor 120, a hydraulic pump 122, a fluid conduit system 124 including a fluid reservoir which provides fluid communication to and from the working head 112, and a control system including user actuated triggers 126, 128. In an alternate embodiment, the main section 110 could be adapted to be connected to a remote hydraulic fluid supply by hydraulic hoses. Yet another embodiment may be adapted to a self contained manually operated hydraulic crimping tool. The housing 118 comprises a handle 130. The triggers 126, 128 are mounted on the handle. The battery 114 is removably mounted to the bottom of the handle 130. The battery 114 comprises a rechargeable battery. In an alternate embodiment the battery might not be removable or might not be rechargeable.

Figure 4:
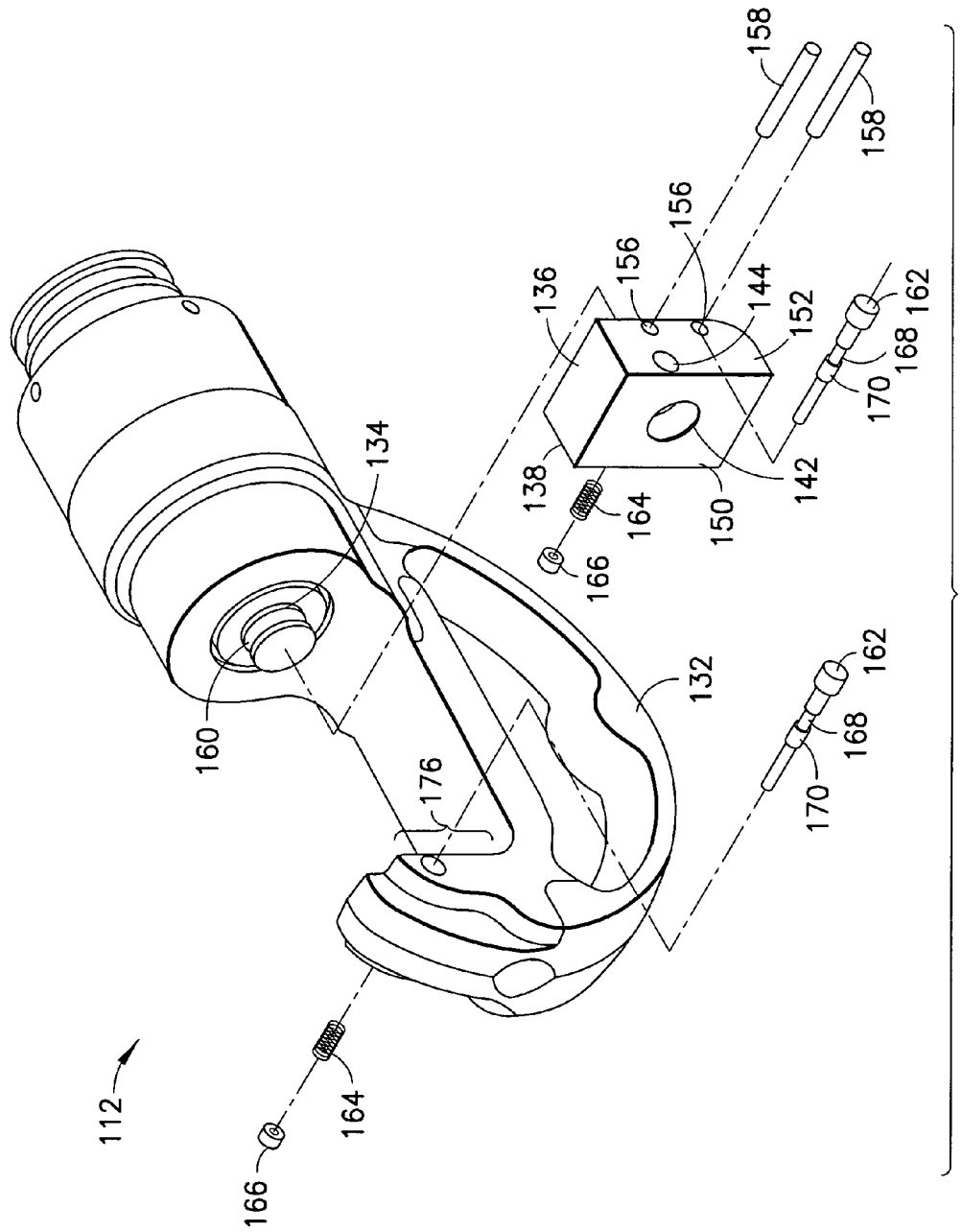
FIG. 4 is an exploded perspective view of a working head used in the hydraulic tool shown in FIG. 3.

Referring now also to FIG. 4, the working head 112 generally comprises a frame 132, a ram 134, and a movable member 136 connected to the ram 134. The ram 134 is movably connected to the frame in a longitudinal direction 135, wherein the ram is adapted to be moved relative to the frame by hydraulic fluid.

Figure 6:
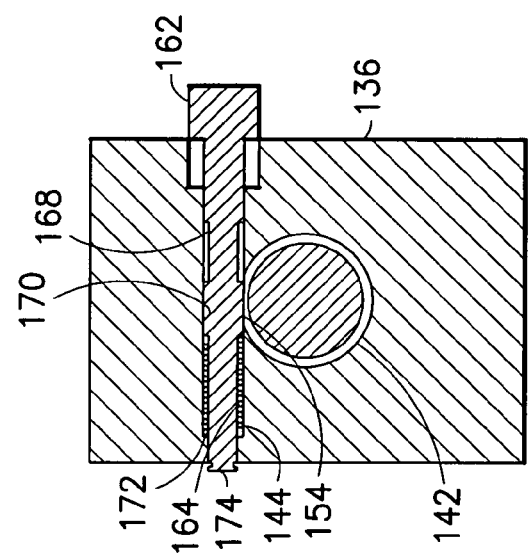
FIG. 6 is a cross section view taken at line 6-6 of the crimp die holder shown in FIG. 5.
Figure 5:
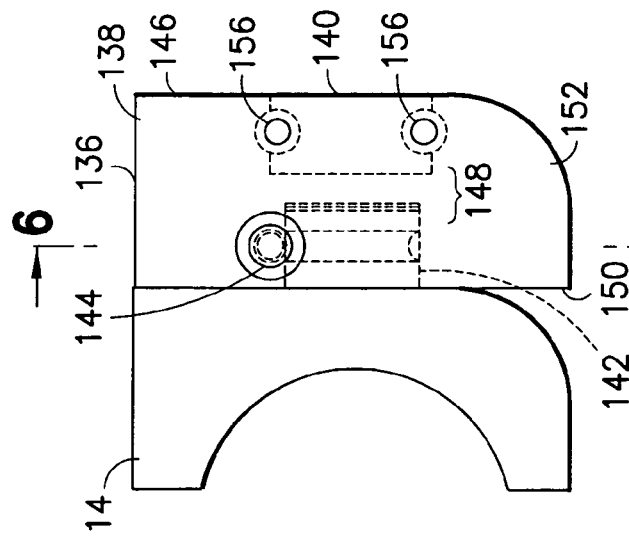
FIG. 5 is an enlarged view of a crimp die holder used in the hydraulic tool shown in FIG. 3.

Referring now also to FIG. 5, the movable member, or die holder, 136 comprises a main body portion 138 having a first recess 140, a second recess 142, and an opening 144. The first recess 140 extends from a first side 146 of the main body portion 138 to a middle section 148 of the main body portion 138. The second recess 142 extends from a second side 150 of the main body portion 138 to the middle section 148. It should be noted that in alternate embodiments, the first recess 140 and the second recess 142 may intersect each other, thus forming a through hole extending between the first side 146 and the second side 150 of the main body portion 138. The first recess 140 and the second recess 142 extend substantially parallel to the longitudinal direction 135 of ram movement. The opening 144 extends from a third side 152 of the main body portion 138. The opening 144 extends substantially perpendicular to the first recess 140 and the second recess 142. The opening 152 intersects a section 154 of the second recess 142 (best illustrated in FIG. 6).

The main body portion further comprises openings 156. The openings 156 extend from the third side 152 of the main body portion 138. The openings 156 extend substantially perpendicular to the first recess 140 and the second recess 142. The openings 156 intersect portions along the perimeter of the first recess 140. The openings 156 are suitably sized and shaped to receive roll pins 158. The die holder 136 is attached to the ram 134 at the first recess 140 wherein the roll pins 158 are configured to engage with a portion of the ram 134 when the end of the ram 134 is received within the first recess 140 and the roll pins 158 are inserted within the openings 156. The ram 134 may comprise an annular groove 160 which is suitably sized and shaped to allow portions of the roll pins 158 to engage with the ram. However, any suitably sized feature allowing for engagement of the roll pins 158 may be provided.

The die holder 136 further comprises a pin 162, a spring 164, and a nut 166. The pin 162 comprises a clearance portion 168 and an engagement portion 170 extending along a length of the pin 162. The clearance portion 168 comprises a smaller diameter than the engagement portion 170. The pin 162 is disposed within the opening 144 with the spring 164 fitted between the engagement portion 170 and a shoulder portion 172 of the opening 144. The spring 164 may be a coil or compression spring for example. The spring 164 biases the pin 162 position within the opening 144 to have the engagement portion 170 aligned with the section 154 of the second recess 142. This allows for the engagement portion 170 of the pin 162 to interfere (or engage) with the annular groove 24 of the crimp die 14 at the section 154 of the second recess 142. The nut 166 may be fastened to the end 174 of the pin 162 by a threaded engagement for example. The nut 166 retains the pin 162 within the opening 144 against the force of the spring 164. It should be noted however that any suitable means for retaining the pin may be provided.

The disclosed configuration allows for the crimp die 14 to be installed or removed by sliding the pin 162 within the opening 144. For example, when the pin 162 is pushed further into the opening 144 (against the spring force) this aligns the clearance portion 168 of the pin 162 with the section 154 of the recess 142. This allows the base portion 22 of the crimp die 14 to be inserted into the recess 142 wherein the annular groove 24 of the crimp die 14 is aligned with the section 154. Releasing the pin 162 allows the biasing force of the spring to move the pin 162 to the position shown in FIG. 6. In this position, the engagement portion 170 of the pin 162 is aligned with the section 154. The larger diameter of the engagement portion 170 extends into the annular groove 24 of the crimp die 14 and secures the die 14 to the die holder 136. To remove the crimp die 14 from the die holder 136, the pin 162 is depressed (against the spring bias force) to align clearance portion 168 with the section 154 of the recess 142. This movement disengages the pin 162 from the annular groove 24 of the crimp die 14 to allow for removal of the base portion 22 from the recess 142.

Figure 7:
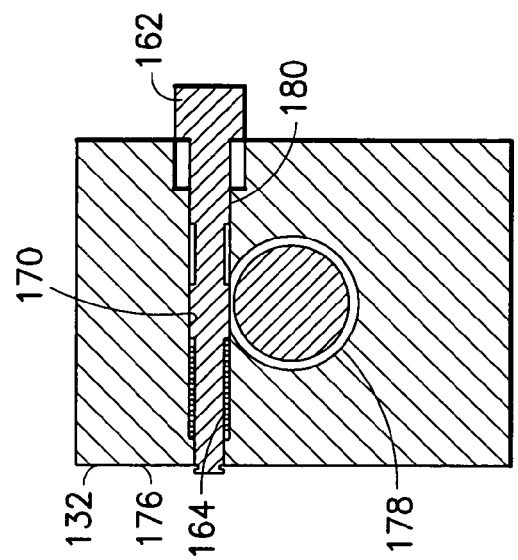
FIG. 7 is a cross section view taken at line 7-7 of the tool shown in FIG. 3.

Similar to the pin configuration within the die holder 136, an end of the frame 132 opposite the die holder 136 is also configured to retain the crimp die 14. As shown in FIGS. 4 and 7, the end of the frame 132 comprises a die holder section 176 having a recess 178 and an opening 180. The recess 178 extends through a portion of the end of the frame 132 in a direction substantially parallel to the longitudinal direction of ram movement. The opening extends through lateral sides of the frame 132 and intersects a portion of the recess 178. Similar to the description above for the die holder 136, the recess 178 is configured to receive a portion of the crimp die 14. The pin 162 is slidably disposed within the opening 180. The pin 162 is configured to be slidable between a first position and a second position. The engagement portion 170 of the pin 162 extends into the recess 178 (and engages the annular groove of the crimp die) when the pin 162 is in the first position. The spring 164 biases the pin 162 in the first position. The pin is in the second position when the spring force is overcome by a user pushing the pin further into the recess 180.

Figure 1:
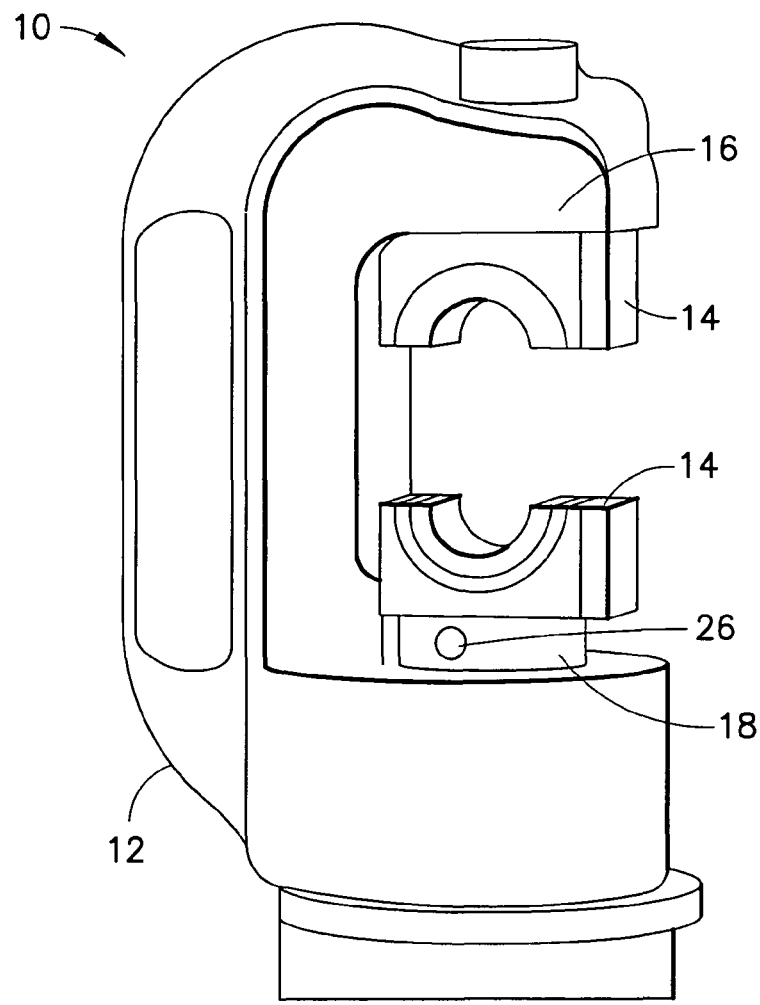
FIG. 1 is a perspective view of a conventional hydraulic tool working head.
Figure 2:
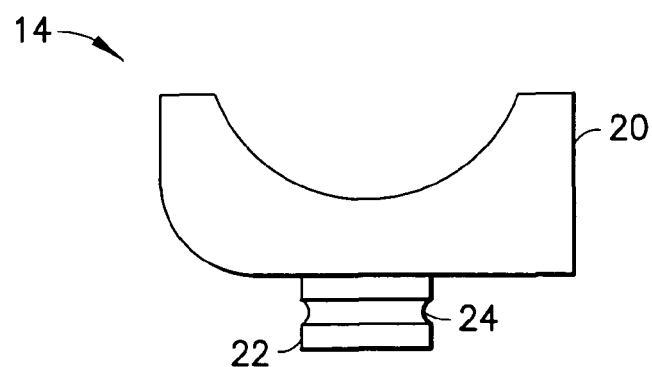
FIG. 2 is an enlarged view of a conventional crimping die used in the conventional hydraulic tool working head shown in FIG. 1.

The invention provides a crimp die holding mechanism with improved features over conventional configurations. The crimp die holding mechanism is configured to receive the crimping dies 14 (hereinafter are referred to as Kearny-type dies) having a main body portion and a base portion extending from the main body portion, wherein the base portion comprises an annular groove. The Kearny-type dies may be the Kearney™ WH2 dies illustrated in FIGS. 1, 2, and 5, for example. However, the term "Kearney-type die" may refer to any suitable crimping die having a main body portion and a base portion extending from the main body portion, wherein the base portion comprises an annular groove. For example, the invention allows for easy installation and removal of the Kearney-type crimp die 14 by hand operation of the pin 162 (as opposed to conventional configurations requiring tool manipulation of the ball detent and/or set screw). Additionally, the disclosed crimp die holding mechanism provides a more robust configuration (as the engagement portion 170 of the pin 162 provides a greater engagement/contact area with the Kearney-type crimp die than an end of the ball detent/set screw) when compared to conventional designs.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A crimp die holder comprising:
   a main body portion comprising a first recess, a second recess, and an opening, wherein the first recess extends from a first side of the main body portion to a middle section of the main body portion, wherein the second recess extends from a second side of the main body portion to the middle section, and wherein the opening extends from a third side of the main body portion and through a section of the second recess;
   a pin disposed within the opening, wherein the pin comprises a first portion along a length of the pin, wherein the first portion of the pin is configured to engage with a portion of a crimp die at the section of the second recess; and
   a spring between the main body portion and the pin.

2. The crimp die holder of claim 1 wherein the opening further comprises a shoulder portion, and wherein the spring is between the first portion of the pin and the shoulder portion.

3. The crimp die holder of claim 1 wherein the first side is opposite the second side.

4. The crimp die holder of claim 1 wherein the opening is substantially perpendicular to the first recess and the second recess.

5. The crimp die holder of claim 1 wherein the opening further comprises a shoulder portion, wherein the spring is between the first portion of the pin and the shoulder portion, and wherein the first side is opposite the second side.

6. The crimp die holder of claim 5 wherein the opening is substantially perpendicular to the first recess and the second recess.

7. The crimp die holder of claim 6 wherein the pin comprises a second portion along a length, of the pin, and wherein the second portion comprises a smaller diameter than the first portion.

8. The crimp die holder of claim 1 wherein the middle section is between the first recess and the second recess.

9. The crimp die holder of claim 1 wherein the first portion of the pin is configured to engage with a portion of a Kearney-type crimp die at the section of the second recess.

10. A working head comprising:
a frame section;
a ram slidably disposed within the frame section; and
a crimp die holder as in claim 1 connected to the ram.

11. A working head comprising:
a frame;
a ram movably connected to the frame, wherein the ram is configured to move in a first direction;
a die holder section proximate an end of the frame, wherein the die holder section is spaced from the ram, wherein the die holder section comprises a recess and an opening, wherein the recess is configured to receive a portion of a crimp die, and wherein the recess extends into a portion of the frame in a direction substantially parallel to the first direction; and
a pin slidably disposed within the opening, wherein the pin is configured to be slidable between a first position and a second position, wherein the pin comprises a first portion along a length of the pin, wherein the first portion extends into the recess when the pin is in the first position, and wherein the first portion of the pin is configured to engage with the portion of the crimp die.

12. The working head of claim 11 further comprising a spring between the die holder section and the pin.

13. The working head of claim 12 wherein the opening further comprises a shoulder portion, and wherein the spring is between the first portion of the pin and the shoulder portion.

14. The working head of claim 11 wherein the opening is substantially perpendicular to the recess.

15. The working head of claim 11 wherein the pin comprises a second portion along a length of the pin, and wherein the second portion comprises a smaller diameter than the first portion.

16. The working head of claim 11 wherein the first portion of the pin is configured to engage with an annular groove of the crimp die.

17. The working head of claim 11 further comprising a crimp die holder connected to the movable ram,
wherein the crimp die holder comprises a main body portion comprising a first recess, a second recess, and an opening, wherein the first recess extends from a first side of the main body portion to a middle section of the main body portion, wherein the second recess extends from a second side of the main body portion to the middle section, and wherein the opening extends from a third side of the main body portion and through a section of the second recess;
a pin disposed within the opening, wherein the pin comprises a first portion along a length of the pin, wherein the first portion of the pin is configured to engage with a portion of a crimp die at the section of the second recess; and
a spring between the main body portion and the pin.

18. The working head of claim 17 wherein the crimp die holder is opposite the die holder section.

19. The working head of claim 11 wherein the recess is configured to receive a portion of a Kearney-type crimp die, and wherein the first portion of the pin is configured to engage with the portion of the Kearny-type crimp die.

20. A hydraulic tool comprising:
a frame section having a hydraulic fluid conduit system;
a hydraulic pump coupled to the conduit system;
and a working head as in claim 11 connected to the frame section.

21. A method of attaching a die to a compression tool comprising:
moving a pin from a first position to a second position within an opening of a working head of the compression tool;
inserting a portion of the die into a recess of the working head, wherein the working head comprises a movable ram, and wherein the die is configured to compress a member at the working head of the compression tool in response to a movement of the movable ram;
moving the pin from the second position to the first position; and
engaging a first portion of the pin with the portion of the die, wherein the first portion of the pin extends along a length of the pin.

22. The method of claim 21 wherein the moving of the pin from the first position to the second position further comprises overcoming a spring bias to move the pin from the first position to the second position.

23. The method of claim 21 wherein the inserting of the portion of the die into a recess of the working head further comprises inserting a portion of a Kearney-type die into a recess of the working head.

* * * * *